United States Patent
Hansemann et al.

[11] Patent Number: 5,805,052
[45] Date of Patent: Sep. 8, 1998

[54] CABLE SYSTEM FOR SIGNAL TRANSMISSION

[75] Inventors: Heinrich Hansemann, Bremen; Herbert Laupichler, Weyhe; Jan-Hermann Müller, Hude; Joachim-Christian Politt, Bremen; Günter Schmitz, Oldenburg; Holger Schröter, Achim, all of Germany

[73] Assignee: Gestra GmbH, Bremen, Germany

[21] Appl. No.: 738,678

[22] Filed: Oct. 28, 1996

[30] Foreign Application Priority Data

Oct. 27, 1995 [DE] Germany .................. 195 40 093.3

[51] Int. Cl.⁶ .................................................. H04M 11/04
[52] U.S. Cl. .................. 340/310.01; 340/310.05; 375/257; 455/3.3
[58] Field of Search ................. 340/310.01, 310.05, 340/310.07; 375/219, 221, 257; 455/3.1, 3.3; 333/32, 124, 130, 263

[56] References Cited

U.S. PATENT DOCUMENTS

| | | |
|---|---|---|
| 4,627,076 | 12/1986 | Staal et al. ..................... 375/257 |
| 4,860,309 | 8/1989 | Costello ......................... 375/257 |
| 4,888,764 | 12/1989 | Haug ............................. 375/257 |
| 5,046,072 | 9/1991 | Shimuzi et al. ................ 375/257 |
| 5,148,144 | 9/1992 | Sutterlin et al. ............ 340/310.01 |
| 5,379,441 | 1/1995 | Watanabe et al. ........... 340/310.01 |
| 5,465,255 | 11/1995 | Tanaka et al. ................. 375/257 |
| 5,483,110 | 1/1996 | Koide et al. ................... 375/257 |

*Primary Examiner*—Brent A. Swarthout
*Assistant Examiner*—Van T. Trieu
*Attorney, Agent, or Firm*—Collard & Roe, P.C.

[57] ABSTRACT

The system provides for one single cable with four electrical conductors (16 to 19). Two of the conductors (18, 19) form a field bus line for the signal transmission, and the other two conductors (16, 17) form an energy line for providing energy supply. All signal transmitters (1, 2) and signal receivers (3, 4) are connected to the cable, and the cable (16–19) is fitted at both ends with a line termination (20–22). Each signal transmitter (1, 2) and each signal receiver (3, 4) has a field bus controller (8, 10). The entire signal transmission takes place via the two-wire field bus line (18, 19).

5 Claims, 1 Drawing Sheet

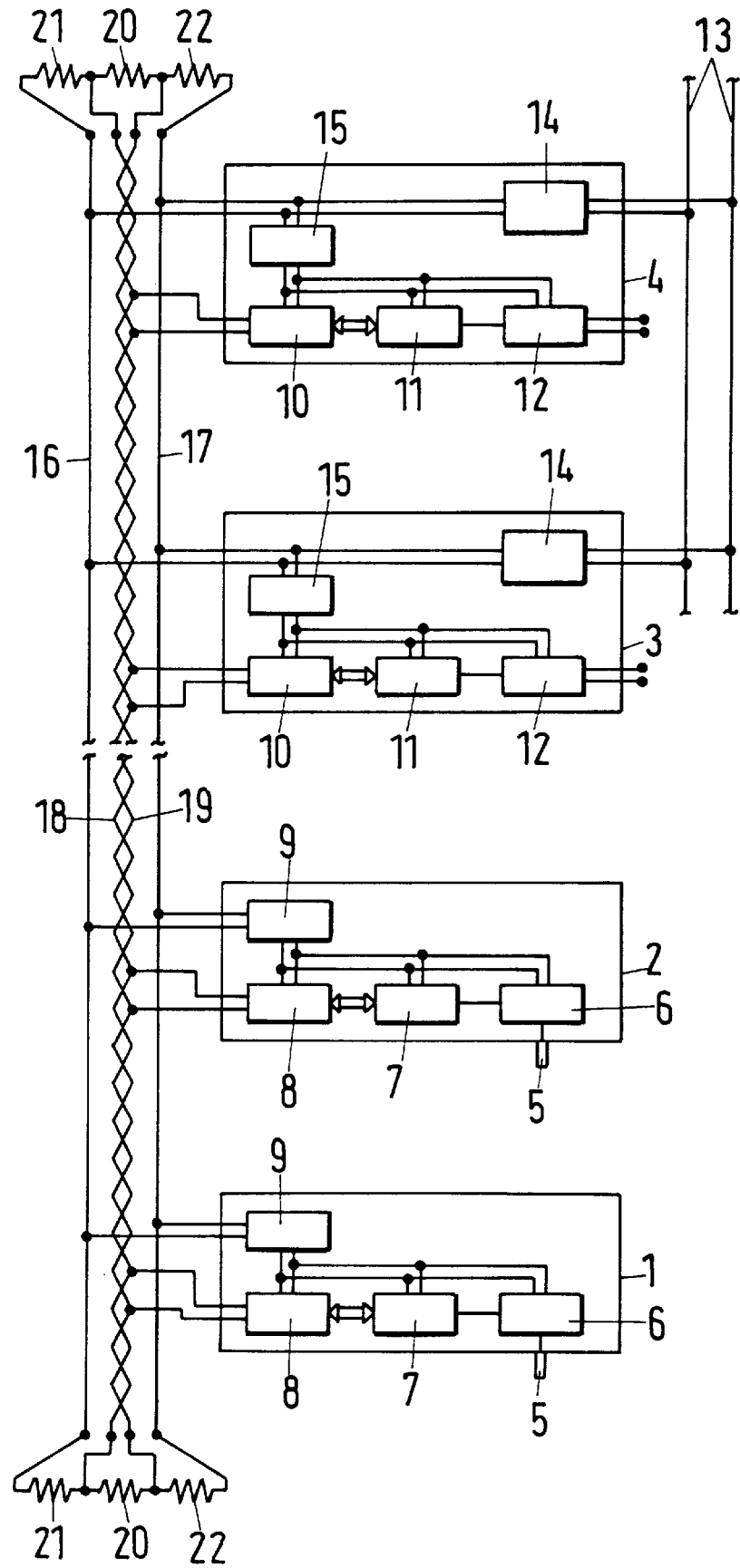

CABLE SYSTEM FOR SIGNAL TRANSMISSION

BACKGROUND OF THE INVENTION

1. Field of the Invention

The present invention relates to electrical signal transmission systems. More particularly, it relates to cable system for signal transmission between transmitters and receivers utilizing one cable with a line system and field bus to transmit and receive multiple signals on the same line.

2. The Prior Art

In measuring and monitoring systems of technical installations, for example in boiler rooms, each measured-value recorder (i.e., signal transmitter) is connected to the associated evaluation device (i.e., signal receiver) via a separate and specific cable. Generally, a large number of signal transmitters are required for measuring and monitoring complex systems. In monitoring a boiler room, for example, a separate signal transmitter is required for temperature monitoring, pressure monitoring, safety monitoring of a minimum liquid level, safety monitoring of a maximum liquid level, and the determination of the actual liquid level. Thus, a large number of cables/wires are required. As the distance between the signal transmitters and the signal receivers increases (e.g. if the latter are arranged in a remotely located control center), the number of cables and wiring represents an important cost factor.

SUMMARY OF THE INVENTION

According to the invention, the signal transmission between the signal transmitters and the signal receivers takes place via a two-wire field bus line. The field bus controllers of the signal transmitters and the signal receivers coordinate the signal transmission such that mutual interferences or influences of the signals are prevented.

In each case, the signal transmission does not necessarily take place between one signal transmitter and one signal receiver. Often times, a signal generated by a transmitter may be picked up and used by a number of signal receivers. The field bus controllers of the invention enable multiple different combinations of transmitted and received signals for this purpose.

In addition to the field bus line, a two-core energy line extends through the cable system. The energy line conducts the supply voltage, and includes termination at both ends of the cable system. The termination at each end causes the electrical voltage potential at both ends of the field bus line to be the same. The equal voltage potentials prevents compensating current flows in the field bus line, and results in lower energy consumption.

Furthermore, a large difference exists between the voltage prevailing during signal transmission in the field bus line and the voltage present in the inoperative condition. This condition is called interference separation. Due to the equality of both end potentials, the sensitivity to interference caused by external electromagnetic absorption is significantly low. The connection of all signal transmitters and signal receivers via the common energy line enables several different energy supply possibilities. This connection not only assures that the same supply voltage is applied to all connected signal transmitters and signal receivers, but that it is also at the same potential in all transmitters and receivers.

The invention uses measured-value recorders as signal transmitters with a sensor and a computer unit. The measured value recorder receives its operating energy from the common energy line. Thus, in the event of an interference on the measured-value recorders, it is possible, since the recorder's do not have their own energy source, to shut off their energy supply from a central point via the common energy line. When switched on again, the computer units of the measured-value recorders re-start from their basic state defined by their software, and as such, no falsification of the signal data is caused.

The measured-value recorder(s) and the signal receiver(s) may be supplied with energy, for example via one single central power main feeding the required energy into the common energy line. In alternative embodiments, it is possible to have one or several of the signal receivers with a power supply for feeding in the required energy. Thus, the feed power can be adapted in each case to the specific requirements of the signal receiver and signal transmitter (measured value recorder).

The field bus controllers can be designed as a controller-area-network bus (CAN-field bus). The CAN-bus provides high interference protection because it operates with differential transmission signals. The two binary states in a transmission signal are represented by positive and negative voltages in the field bus line. The polarity of the voltage is determinative for signal detection voltage variations do not interfere or influence the system.

The conductors of the field bus line are twisted, and thereby provide extremely high insensitivity of the field bus to electromagnetic absorption from external sources.

It is therefore an object of the present invention to provide a cable system for signal transmission in monitoring large industrial installations.

It is another object of the invention to provide a single cable system for signal transmission that can be used with a multiple signal transmitters and receivers simultaneously.

It is another object of the invention to provide a cable system for signal transmission that utilizes a field bus line.

It is a further object of the invention to provide a cable system for signal transmission that requires less energy to operate and is not subject to compensating currents.

Yet another object of the invention is to provide a cable system for signal transmission that reduces the overall wire cost for monitoring large industrial installations.

A further object of the invention is to provide a cable system for signal transmission that is easy to manufacture, and operates efficiently and reliably.

BRIEF DESCRIPTION OF THE DRAWINGS

Other objects and features of the present invention will become apparent from the following detailed description discloses an embodiment of the present invention. It should be understood, however, that the drawing is designed for the purpose of illustration only and not as a definition of the limits of the invention.

The drawing is a schematic block diagram of the signal transmission system according to the invention.

DETAILED DESCRIPTION OF PREFERRED EMBODIMENTS

The FIGURE shows the signal transmission system 30 according to the invention. System 30 can be used for monitoring physical quantities in an industrial installation (e.g. in a boiler installation not shown). Two de-centrally arranged measured-value recorders 1 and 2 are signal transmitters, and two centrally arranged evaluation devices 3 and 4 are signal receivers. The number if measured value recorders and evaluation devices connected to the system depends on the monitoring application, and is not limited by the invention.

The measured-value recorders or signal transmitters 1 and 2 each have a sensor 5 for determining the physical quantity to be monitored (e.g. filling level, temperature, pressure, etc.). Sensor 5 is connected to an adaptor device 6, which is coupled to a computer unit 7. Computer unit 7 is coupled to field bus controller 8. A voltage transformer 9 supplys DC voltage to controller 8, computer unit 7 and adaptor 6. Each evaluation device or signal receiver 3 and 4 has a field bus controller 10, and a computer unit 11 coupled to controller 10 on one side, and an output relay 12 on the other. In addition, in each evaluation device/signal receiver 3 and 4, a power supply 14 serves as the energy source. Power supply 14 is connected to the main electric power supply lines 13 and receives its power therefrom. A voltage transformer 15 is connected to power supply 14 and supplies the required DC voltage for operation.

A four conductor cable serves as the electrical line for the system. Conductors 16 and 17 form an energy line, and twisted conductors 18 and 19 form a field bus line. Three resistors 20–22 are connected to each of the two ends of the line system in to form a voltage divider. Resistors 20 are connected between the ends of the two twisted conductors 18 and 19 of the field bus line. Resistors 21 are connected between the ends of conductor 18 of the field bus line, and conductor 16 of the energy line, and resistors 22 are connected between the ends of conductor 19 of the field bus line and conductor 17 of the energy line. The total resistance of resistors 20–22 corresponds to the wave resistance or characteristic impedance $Z_o$ of the field bus line 18, 19. The field bus controllers 8 and 10 of the measured-value recorders 1, 2 and evaluation devices 3, 4, respectively, are designed as Controller-Area-Network bus devices (CAN-bus, see ISO 11898), and are connected to field bus line 18, 19. The power supplies 14 and voltage transformers 9 and 15 are connected to the energy line conductors 16 and 17.

In the operating condition, the AC voltage of the main electric power lines 13 (e.g. 230 volts), is applied to power supplies 14, which generate a DC supply voltage, such as, for example, 24 volts. The DC voltage generated by power supplies 14 is transformed or stepped down into the operating voltage required (e.g. 5 volts) within the evaluation devices 3, 4 by voltage transformers 15.

The power supplies 14 feed the supply voltage into the energy line 16, 17. The supply voltage fed into energy line 16, 17 is fed into voltage transformers 9, and thereby transformed into the operating voltage required for the measured-value recorders 1 and 2.

Sensors 5 transmit an electrical signal to the adaptor device 6 indicative of the physical quantity to be monitored. Adaptor device 6 adapts the received electrical signal into a suitable signal for computer unit 7. For example, adaptor device 6 may provide signal amplification, current limitation, analog-to-digital conversion, etc. In addition to controlling the communication between field bus controllers 8 and adaptor device 6, computer unit 7 converts the signal received into a data format suitable for transmission.

Field bus controllers 8, receive the signal data from computer unit 7 and completes the transformation of the data signal into a CAN-bus signal, which is fed from the controller into field bus line 18, 19. At the same time, field bus controllers 8 and 10 coordinate the signal transmission via the two-wire field bus line 18, 19 such that regardless of the number of measured-value recorders 1, 2 and evaluation devices 3, 4 connected to the system, no mutual interference or influencing occurs during the signal transmission. The field bus controller 10, of the evaluation device 3 or 4, belonging to the respective measured-value recorder 1 or 2, picks up the CAN-bus signal present in field bus line 18, 19, and transfers the signal data contained therein to computer unit 11. Computer unit 11 performs an evaluation of the received signal, such as, for example, actual value vs. desired value comparison. If subsequently necessary, computer unit 11 transmits a control pulse to output relay 12, so that the components connected to the outputs 32 of said relay are controlled (e.g. warning device, burner, pump, adjusting valve, etc.).

Since the common energy line 16, 17 is terminated at both ends by the resistors 20 to 22, the supply voltage in the measured-value recorders 1, 2, as well as in the evaluation devices 3, 4 is at the same potential. In addition, the voltage potential is the same at the ends of the field bus line 18, 19. As a result, compensation currents in the field bus line conductors 18 and 19 connected with potential differences are avoided. This reduces the energy requirement.

The voltage in the field bus line 18, 19 is at a defined potential in the inoperative condition (i.e., when no signal transmission takes place). A significant defined difference exists between the voltage of the field bus line 18, 19 in the inoperative condition, and the voltage prevailing during signal transmission.

The field bus controllers 8 and 10 emit a differential signal (i.e., within the signal to be transmitted). One binary state is represented by a positive DC voltage, and the other binary state by a negative DC voltage. The polarity of the voltage, and not the levels govern as the signal. The result is a clear and significantly interference-proof signal transmission. Since conductors 18 and 19 are twisted together, the insensitivity to electromagnetic absorption from external sources is also very high. The twisting of conductors 18 and 19 creates a bifilar line and provides field bus line (18, 19) with a characteristic impedance $Z_o$ which increases the insensitivity to electromagnetic absorption.

Due to installation requirements, measured-value recorders 1, 2, etc., are frequently very remotely installed in terms of location, whereas the evaluation devices 3, 4 are preferably arranged in a control center, for example in a common switch box. The power supplies 14 which are the energy sources for all monitoring components 1–4 are present in the evaluation facilities 3, 4, and are thereby located in the control center. Therefore, if necessary, the energy supply for the remotely installed measured-value recorders 1, 2, etc., can be switched off and switched on from the control center. Following switch-on, their computer units 7 and field bus controllers 8 re-start from a basic condition defined by their software. This eliminates potential signal interferences or signal falsifications.

While one embodiment of the present invention have been shown and described, it is to be understood that many changes and modifications may be made thereunto without departing from the spirit and scope of the invention as defined in the appended claims.

What is claimed is:

1. A signal transmission cable system for transmitting signals between at least one signal transmitter and a least one signal receiver comprising:

a line system having two ends and four electrical conductors (16–19), two of said conductors (18, 19) forming a field bus line for signal transmission, and the other two of said conductors (16, 17) forming an energy line for providing an electrical energy supply to each of the at least one signal transmitters and receivers;

a field bus controller disposed in each of the signal receivers and transmitters, for connecting each of the signal receivers and transmitters to said field bus line, said field bus line having a characteristic impedance $Z_o$;

first resistor means (20) coupled to each of said two ends of the line system and being connected between the two conductors (18, 19) of said field bus line;

second resistor means (21) coupled to each of said two ends of the line system and being connected between one conductor (18) of said field bus line and one conductor (16) of said energy line;

third resistor means (22) each being coupled to each of said two ends of the line system and being connected between the other conductor (19) of said field bus line and the other conductor (17) of said energy line; and wherein the total resistance of said first, second and third resistor means (20–22) is equal to $Z_o$.

2. The system according to claim 1, wherein each of the at least one signal transmitters (1, 2) further comprises a computer unit (7) coupled to said field bus controller (8), and a sensor (5) coupled to said computer, said sensor receiving measured values, wherein the at least one signal transmitters (1,2) receives its operating energy from said energy line.

3. The system according to claim 2, wherein said at least one signal receiver (3, 4) comprises an energy source (14) for feeding the operating energy into said energy line (16, 17).

4. The system according to claim 1, wherein said field bus controller is designed as a controller-area-network-bus (CAN-bus).

5. The system according to claim 1, wherein the two conductors (18, 19) of said field bus line are a twisted bifilar pair.

* * * * *